United States Patent [19]

Ishizaka et al.

[11] Patent Number: 4,579,433

[45] Date of Patent: Apr. 1, 1986

[54] FILM SENSITIVITY SETTING DEVICE FOR CAMERA

[75] Inventors: Sunao Ishizaka; Osamu Maida, both of Tokyo, Japan

[73] Assignee: Nippon Kogaku K.K., Tokyo, Japan

[21] Appl. No.: 667,815

[22] Filed: Nov. 2, 1984

[30] Foreign Application Priority Data

Nov. 7, 1983 [JP]  Japan ................................ 58-208866

[51] Int. Cl.$^4$ .............................................. G03B 7/24
[52] U.S. Cl. .................................... 354/21; 354/289.1
[58] Field of Search ...................... 354/21, 289.1, 217, 354/218, 286; 352/78 C

[56] References Cited

U.S. PATENT DOCUMENTS 4,200,371  4/1980  Suzuki et al. ...................... 354/217
4,304,482  12/1981  Suzuki et al. .................... 354/289.1

Primary Examiner—Russell E. Adams
Attorney, Agent, or Firm—Shapiro & Shapiro

[57] ABSTRACT

A film sensitivity setting device for camera is provided with a circuit board comprising a first information unit with a conductor pattern which detects the film sensitivity information signal from a film cartridge having such signal and corresponds to the information signal of the manually set film sensitivity, and a second information unit with a conductor pattern for transmitting the detected information signal, wherein the exposure of the film is controlled according to the information signal obtained by electrical contact with the conductor pattern of either the first or the second information unit.

5 Claims, 10 Drawing Figures

F I G. 7A
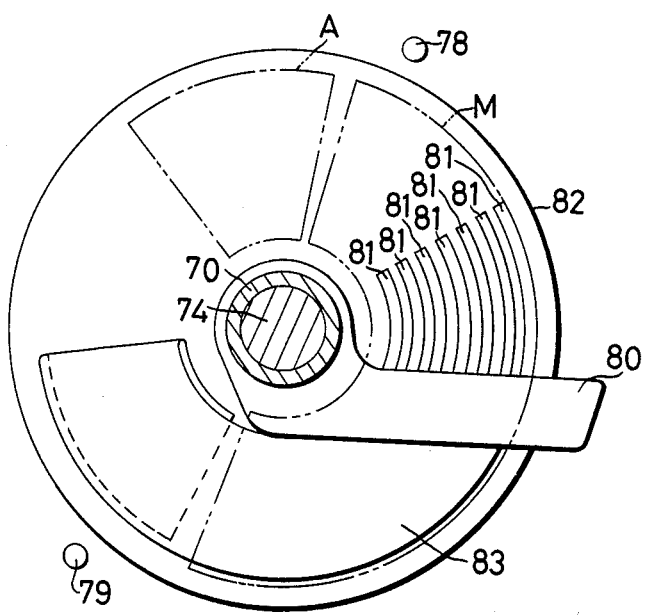
F I G. 7B
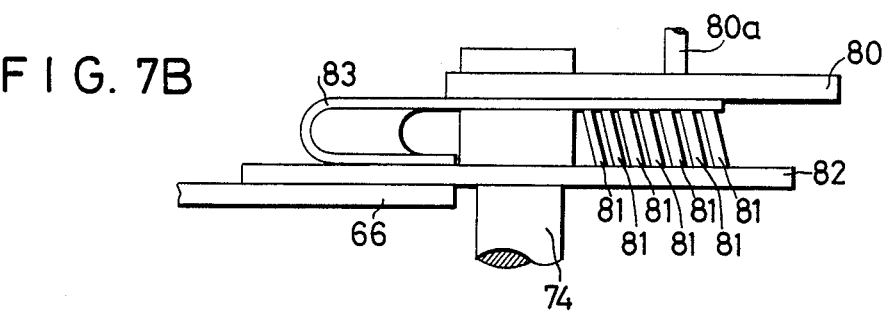

FILM SENSITIVITY SETTING DEVICE FOR CAMERA

BACKGROUND OF THE INVENTION

1. Field of the Invention

The present invention relates to a film sensitivity setting device for a camera, capable of automatically setting the film sensitivity when a film cartridge having a film sensitivity information signal is loaded.

2. Description of the Prior Art

It is already proposed to attach various information, including film sensitivity information, in the form of codes to the film cartridge. There is therefore required a camera capable of automatically setting the film sensitivity, when a film cartridge bearing the film sensitivity information is loaded in the camera, by reading the corresponding code through an information detecting circuit in the camera.

SUMMARY OF THE INVENTION

The object of the present invention is to provide a film sensitivity information setting device for a camera, allowing manual setting of the film sensitivity and still being capable of detecting the film sensitivity information attached to the film cartridge.

The foregoing object can be achieved according to the present invention by a device provided with a circuit board comprising a first information unit with a conductor pattern which detects the film sensitivity information signal from a film cartridge having such signal and corresponds to the information signal of the manually set film sensitivity, and a second information unit with a conductor pattern for transmitting the detected information signal, wherein the exposure of the film is controlled according to the information signal obtained by electrical contact with the conductor pattern of either the first or the second information unit.

BRIEF DESCRIPTION OF THE DRAWINGS

FIG. 7A is a plan view showing the relation between a brush and the pattern of the printed circuit board at manual film sensitivity setting; and FIG. 7B is a lateral view of FIG. 7A.

DESCRIPTION OF THE PREFERRED EMBODIMENTS

Figure 1:
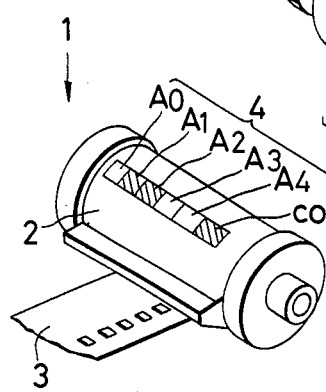
FIG. 1 is a perspective view of a film cartridge bearing film sensitivity information signal.
Figure 2:
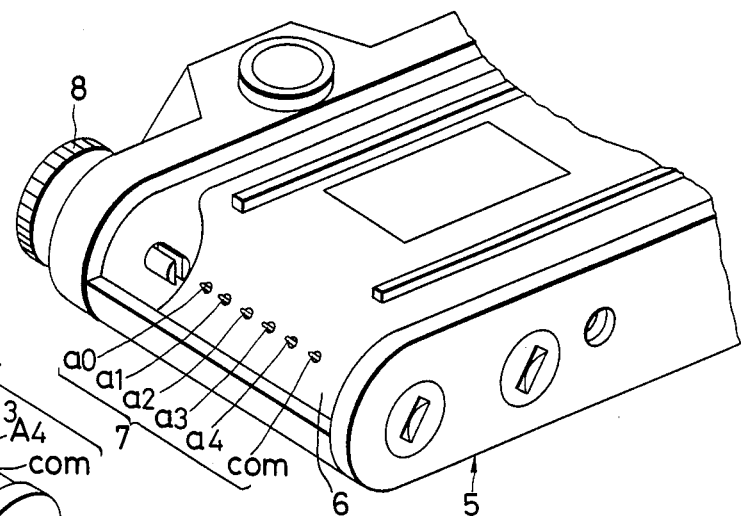
FIG. 2 is a perspective view of a camera capable of automatically reading said information signal when said film cartridge is loaded.

FIGS. 1 and 2 respectively show a film cartridge and a camera relating to the present invention. In FIG. 1, the cartridge 2 of the film 1 is provided on the surface thereof with codes representing the film sensitivity (ISO sensitivity). The codes 4 consist of six codes A0-A4, COM placed dividedly on the surface of the cartridge 2. Said six codes are composed of conductive areas in which the point is locally removed to expose the cartridge 2 and insulating areas in which said cartridge 2 is not exposed, wherein the code COM is rendered always conductive. When such film 1 is loaded in a camera 5 shown in FIG. 2, the codes 4 respective contact with contact pins a0-a4, com provided in a cartridge chamber 6. The contact pins 7 (a0-a4, com) in contact with the codes 4 (A0-A4, COM) detect the conductive and non-conductive states thereof, and the signals detected by said pins automatically provide the ISO sensitivity through an information detecting circuit to be explained later.

Tab. 1 shows an example of the format of the codes 4 to be attached to the film 1, as proposed by a film manufacturer.

Figure 3:
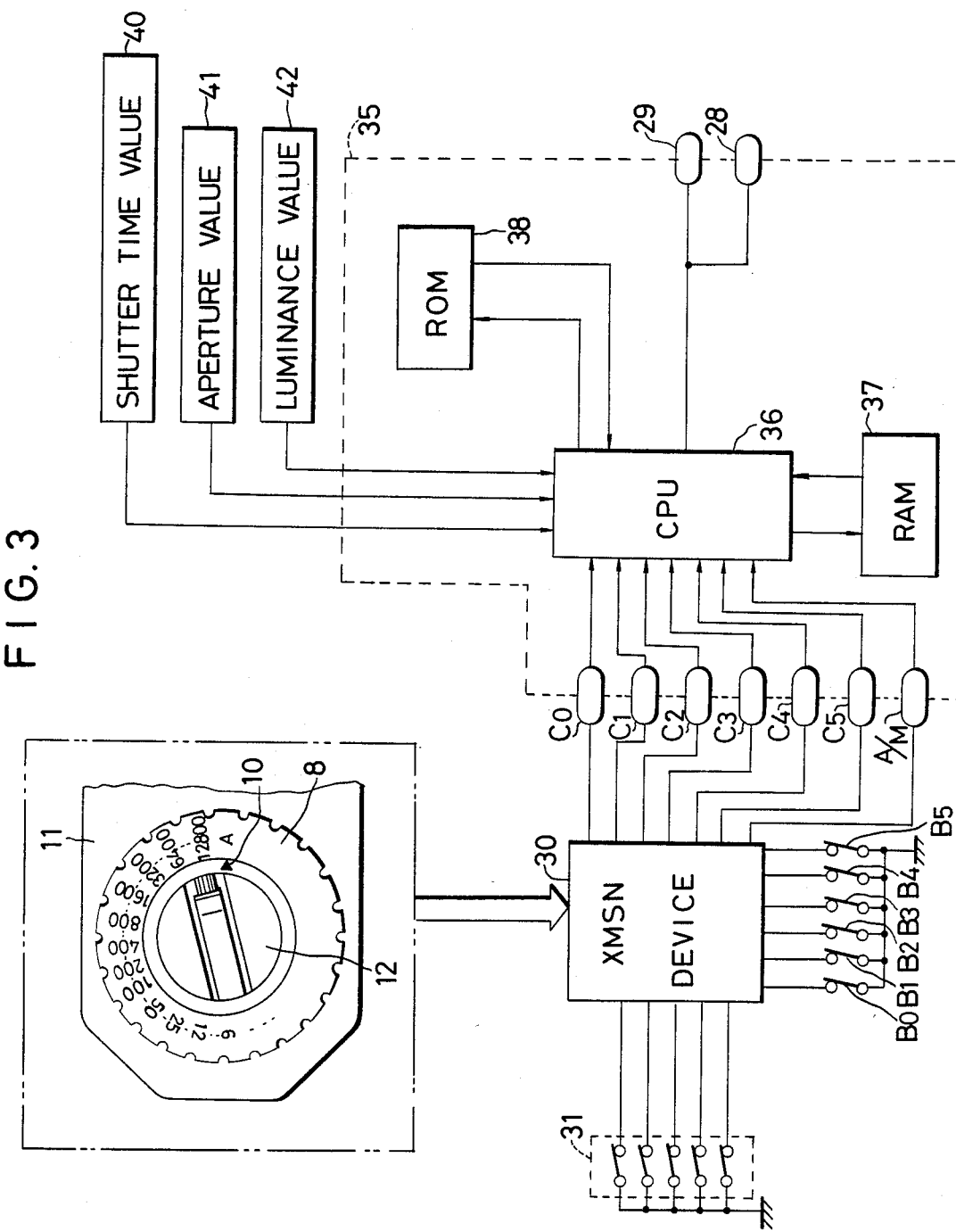
FIG. 3 is a schematic block diagram of a film sensitivity setting device of the present invention.

The automatically settable range of the ISO sensitivity is from 25 to 5000, and the codes A0-A4 represent special binary codes for identifying three steps between the neighboring ISO sensitivities. On the other hand, the manually settable ISO sensitivity in a range from 6 to 12800, shown on an ISO sensitivity setting dial 8 in FIG. 3, is represented by 6-bit gray codes B'0-B'5.

In the manual setting of the ISO sensitivity, plural brushes linked with the rotation of the dial 8 are electrically contacted, as will be explained later, with a conductor pattern provided on a printed circuit board corresponding to the film information to generate a binary code signal corresponding to the set ISO sensitivity. In this case, an incomplete contact between the brushes and the conductor pattern leads to a danger of generating erroneous signals. Consequently, in order to reduce the difference of the ISO sensitivities represented by a correct signal and an erroneous signal even in case such erroneous signal is generated, the ISO sensitivity in the manual setting is represented by the gray code.

TABLE 1

| ISO sensitivity | Auto settable code | | | | | Manually settable code | | | | | |
|---|---|---|---|---|---|---|---|---|---|---|---|
| | A4 | A3 | A2 | A1 | A0 | B5' | B4' | B3' | B2' | B1' | B0' |
| 6 | | | | | | 0 | 0 | 0 | 0 | 0 | 0 |
| . | | | | | | 0 | 0 | 0 | 0 | 0 | 1 |
| . | | | | | | 0 | 0 | 0 | 0 | 1 | 1 |
| 12 | | | | | | 0 | 0 | 0 | 0 | 1 | 0 |
| . | | | | | | 0 | 0 | 0 | 1 | 1 | 0 |
| . | | | | | | 0 | 0 | 0 | 1 | 1 | 1 |
| 25 | 1 | 1 | 1 | 0 | 1 | 0 | 0 | 0 | 1 | 0 | 1 |
| . | 1 | 1 | 1 | 1 | 0 | 0 | 0 | 0 | 1 | 0 | 0 |
| . | 1 | 1 | 1 | 0 | 0 | 0 | 0 | 1 | 1 | 0 | 0 |
| 50 | 0 | 1 | 1 | 0 | 1 | 0 | 0 | 1 | 1 | 0 | 1 |
| . | 0 | 1 | 1 | 1 | 0 | 0 | 0 | 1 | 1 | 1 | 1 |
| . | 0 | 1 | 1 | 0 | 0 | 0 | 0 | 1 | 1 | 1 | 0 |
| 100 | 1 | 0 | 1 | 0 | 1 | 0 | 0 | 1 | 0 | 1 | 0 |
| . | 1 | 0 | 1 | 1 | 0 | 0 | 0 | 1 | 0 | 1 | 1 |
| . | 1 | 0 | 1 | 0 | 0 | 0 | 0 | 1 | 0 | 0 | 1 |
| 200 | 0 | 0 | 1 | 0 | 1 | 0 | 0 | 1 | 0 | 0 | 0 |
| . | 0 | 0 | 1 | 1 | 0 | 0 | 1 | 1 | 0 | 0 | 0 |
| . | 0 | 0 | 1 | 0 | 0 | 0 | 1 | 1 | 0 | 0 | 1 |
| 400 | 1 | 1 | 0 | 0 | 1 | 0 | 1 | 1 | 0 | 1 | 1 |
| . | 1 | 1 | 0 | 1 | 0 | 0 | 1 | 1 | 0 | 1 | 0 |
| . | 1 | 1 | 0 | 0 | 0 | 0 | 1 | 1 | 1 | 1 | 0 |
| 800 | 0 | 1 | 0 | 0 | 1 | 0 | 1 | 1 | 1 | 1 | 1 |
| . | 0 | 1 | 0 | 1 | 0 | 0 | 1 | 1 | 1 | 0 | 1 |
| . | 0 | 1 | 0 | 0 | 0 | 0 | 1 | 1 | 1 | 0 | 0 |
| 1600 | 1 | 0 | 0 | 0 | 1 | 0 | 1 | 0 | 1 | 0 | 0 |
| . | 1 | 0 | 0 | 1 | 0 | 0 | 1 | 0 | 1 | 0 | 1 |
| . | 1 | 0 | 0 | 0 | 0 | 0 | 1 | 0 | 1 | 1 | 1 |
| 3200 | 0 | 0 | 0 | 0 | 1 | 0 | 1 | 0 | 1 | 1 | 0 |
| . | 0 | 0 | 0 | 1 | 0 | 0 | 1 | 0 | 0 | 1 | 0 |

TABLE 1-continued

| ISO sensitivity | Auto settable code | | | | | Manually settable code | | | | | |
|---|---|---|---|---|---|---|---|---|---|---|---|
| | A4 | A3 | A2 | A1 | A0 | B5' | B4' | B3' | B2' | B1' | B0' |
| 5000 | 0 | 0 | 0 | 0 | 0 | 0 | 1 | 0 | 0 | 1 | 1 |
| 6400 | | | | | | 0 | 1 | 0 | 0 | 0 | 1 |
| . | | | | | | 0 | 1 | 0 | 0 | 0 | 0 |
| . | | | | | | 1 | 1 | 0 | 0 | 0 | 0 |
| 12800 | | | | | | 1 | 1 | 0 | 0 | 0 | 1 |
| . | | | | | | 1 | 1 | 0 | 0 | 1 | 1 |
| . | | | | | | 1 | 1 | 0 | 0 | 1 | 0 |

FIGS. 3 to 5B show a first embodiment of the present invention, in which FIG. 3 schematically shows the structure of the device of the present invention. A camera 11 has a device for automatic and manual setting of the ISO sensitivity as in the camera 5 shown in FIG. 2, and is provided with the ISO sensitivity setting dial 8 around a film rewinding knob 12. The dial 8 has marks of the ISO sensitivities 6–12800 for manual setting and a mark A representing the automatic setting of the ISO sensitivity. When the operator matches one of the ISO sensitivities 6–12800 with an indicator 10 by rotating the dial 8, a transmission device 30 is shifted to a manual set mode, whereby a gray code output corresponding to the ISO sensitivity is transmitted from switches B0–B5 to a processing circuit 35. On the other hand, when the operator matches the mark A with the indicator 10, the transmission device 30 is shifted to an automatic set mode, whereby an output of switches 31 corresponding to the binary code on the cartridge (cf. FIG. 1) is transmitted to the processing circuit 35. The processing circuit 35 is composed of a central processing unit (CPU) 36, a random access memory (RAM) 37 and a read-only memory (ROM) 38 for converting the binary code signal representing the film information from the cartridge 2 and the gray code signal obtained by manual setting of the dial 8 into binary code signals employed in the data processing for exposure control. When the mark A of the dial 8 is matched, the signals of the switches 31 transmitted through the transmission device 30 are supplied to input ports C0–C4 of the processing circuit 35, and a signal indicating the automatic set mode is supplied through an auto/manual switching port A/M to the CPU 36. In response to said signal the CPU 36 converts the special binary code signal representing the automatically set ISO sensitivity into a binary code signal used for data processing, according to the correlation between the binary code signals from the cartridge and the binary code signals for the data processing stored in the ROM 38, and enters thus converted signal into the RAM 37. Also the CPU 36 enters information signals for the shutter time 40, aperture value 41 and luminance value 42 of the object into the RAM 37, and calculates an appropriate exposure from these signals. On the other hand, when one of the ISO sensitivities 6–12800 is selected by the dial 8, the signals of the switches B0–B5 transmitted by the transmission device 30 are entered to the input ports C0–C5 of the processing circuit 35, and a signal indicating the manual set mode is supplied to the auto/manual switching port A/M, whereby the CPU 36 converts, in response to said signal, the gray code signals representing the manually set ISO sensitivity entered from the input port C0–C5 into binary code signals, according to the correlations between the gray code signals and the binary code signals for data processing stored in the ROM 38, and supplies thus converted signals into the RAM 37.

Figure 4A:
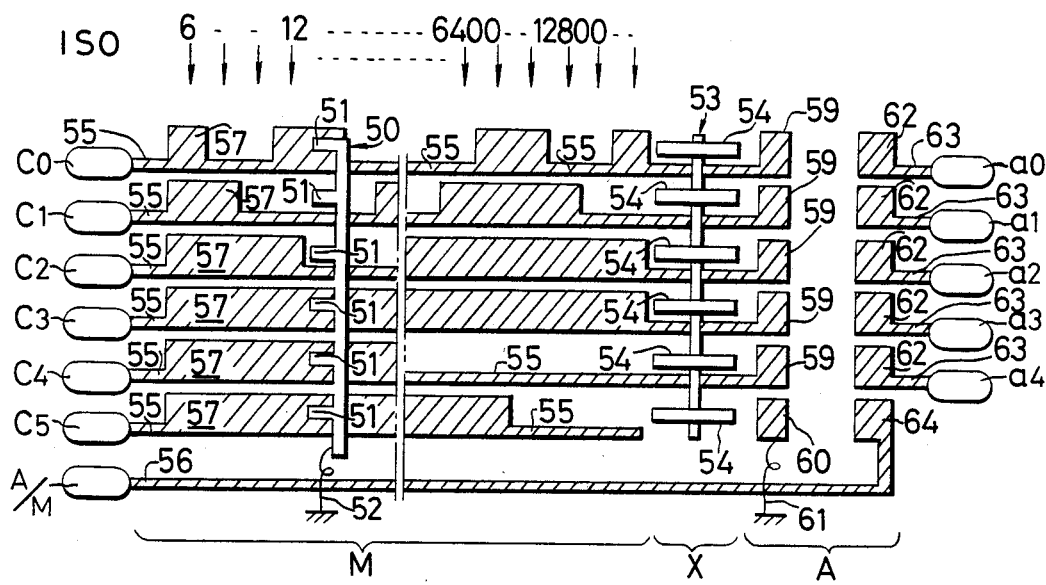
FIG. 4A and 4B are expansions of printed circuit boards for film sensitivity setting.
Figure 4B:
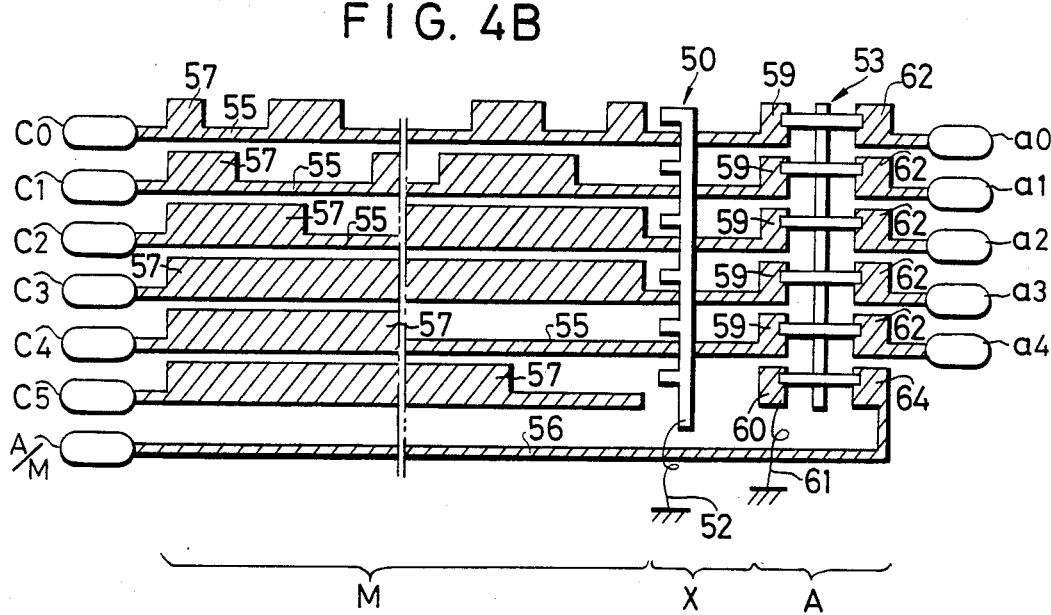

FIGS. 4A and 4B illustrate a printed circuit board having a 6-bit gray code pattern and shaped as an arc positioned under the dial 8 about the shaft thereof, said pattern being illustrated in a linear form for the purpose of clarity. Each pattern consists of a horizontally extended line connecting pattern 55 and "0" patterns 57 corresponding to "0" in the manually settable code shown in Tab. 1. For the purpose of clarity, the conductor pattern and the "0" gray code patterns are marked with hatching. The gray code patterns 55 are marked with hatching. The gray code patterns 55 are connected at one ends thereof to input ports C0–C5 of the processing circuit 35, while the other ends corresponding to the ports C0–C4 are connected to patterns 59 for shortcircuiting terminals a0–a4, and an independent and unconnected pattern 60 for grounding the port A/M is provided at the other end corresponding to the port C5. Said pattern 60 is grounded by a wire 61.

Corresponding to said patterns 59 there are provided five patterns 62 which are connected through patterns 63 to the contact pins a0–a4 contacting the codes 4 on the film cartridge 2. Similarly corresponding to the pattern 60 there is provided a pattern 64 which is connected through a pattern 56 to the switching port A/M of the processing circuit 35. Brushes 51, 54 supported by support members 50, 53 slide on the printed circuit board having the above-described patterns to obtain various signals. The brushes 54 electrically connect the patterns 59 with the patterns 62 at the automatic setting mode. The support member 53 support the brushes 54 in mutually insulated state. The support member 50 moves in range M and X, while the support member 53 moves in ranges X and A. The range M corresponds to the area of "0" patterns 57 corresponding to the ISO sensitivities 6–12800, while the range A corresponds to the area of the patterns 59 and 62, and the range X corresponds to an insulating area between said ranges M and A. The brushes 51 are collectively grounded by a wire 52. In FIG. 4B the numerals 51, 54 are omitted for the purpose of simplicity.

FIG. 4A shows a state in the manual setting mode of the ISO sensitivity, wherein an automatic brush consisting of the brushes 54 and the support member 51 remain in the range X and is therefore irrelevant from the input signals to the ports C0–C5. On the other hand, a manual brush consisting of the brushes 51 and the support member 50 can move in the range X in response to the rotation of the ISO sensitivity setting dial 8. In this state, the switching port A/M releases a signal indicating that the signals entered to the port C0–C5 are gray code signals since the pattern 64 is not grounded. Consequently, gray code signals corresponding to the ISO sensitivity at the position of said manual brush are supplied to the processing circuit 35 through the input ports C0–C5. In the illustrated position of the manual brush, the input ports C0–C5 respectively receive signals "0", "1", "1" "0", "0" and "0" corresponding to the ISO sensitivity 16. Thereafter the processing circuit 35 calculates the appropriate exposure as explained before.

FIG. 4B shows a state in the automatic setting mode, wherein said manual brush remains in the range X and is therefore irrelevant from the input signals to the ports C0–C5. The automatic brush is moved by the dial 8 from the range X to the range A to short-circuit five patterns 59 with the patterns 62 and the pattern 60 with the pattern 64. In this state, the switching port A/M supplies the CPU 36 with, a signal indicating that the binary signals from the cartridge 2 are supplied to the ports C0–C5, since the pattern 64 is grounded. Consequently the ISO sensitivity information signals provided by the codes 4 of the film cartridge are transmitted to the input ports C0–C4 through the patterns 62, brushes 54, patterns 59 and patterns 55.

Figure 5A:
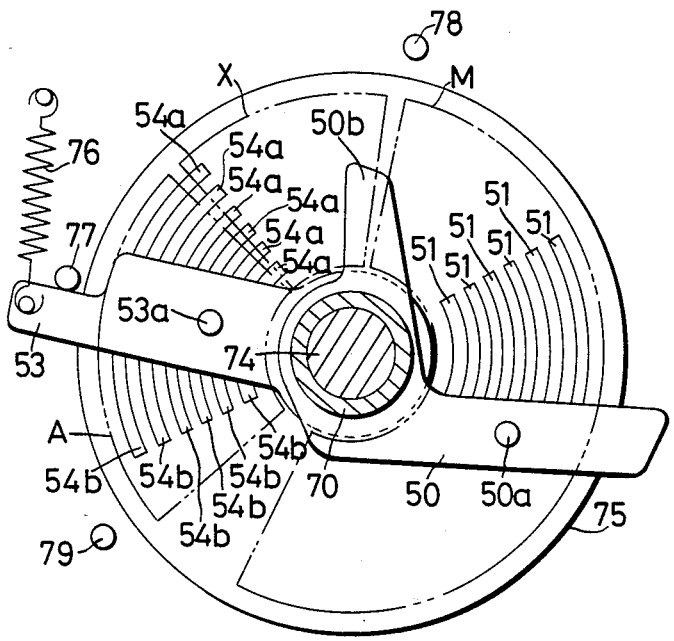
FIG. 5A is a plan view showing the relation between a brush and the pattern of the printed circuit board at manual film sensitivity setting.
Figure 5B:
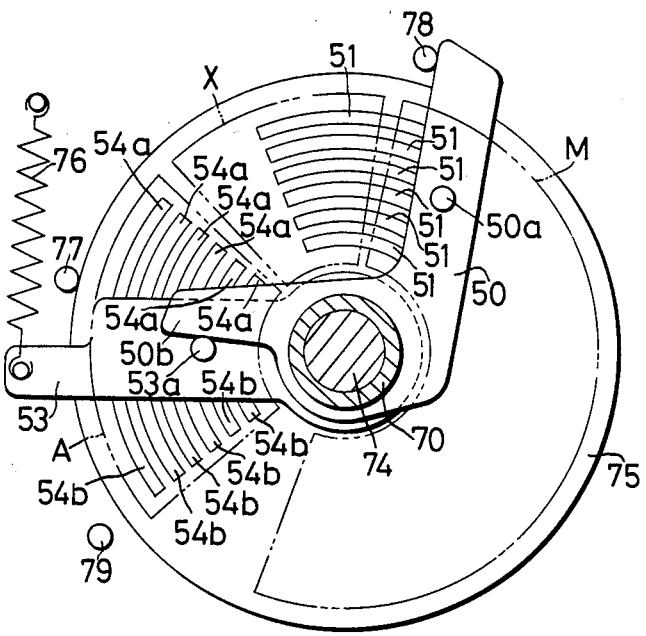
FIG. 5B is a plan view showing the relation between said brush and the pattern of the printed circuit board at automatic film sensitivity setting.

Now reference is made to FIGS. 5A and 5B for explaining the structure and function of the ISO sensitivity setting dial actuating said automatic and manual brushes.

The film rewind knob 12 is fixed on a shaft 74, around which provided is a block 70 for rotating support members 50, 53. An engaging pin 50a protruding from the support member 50 of the manual brush transmits the rotation of the dial 8 to the support member 50. The support member 50 of the manual brush and the support member 53 of the automatic brush can move together through an engaging member 50b and an engaging pin 53b. The support member 50 supports six brushes 51 which are all grounded. The support member 53 supports six brushes 54 which are mutually insulated. Said brushes glide on the patterns provided on the printed circuit board 75 fixed in the camera body. The board 75 receives the signals from the contact pins a0–a4, and said signals are transmitted to the patterns 62 on the board 75 through the through-holes thereof. Also the signals from the board 75 are transmitted, from the connecting patterns 55 at the end of the range M, to the input ports C0–C5 of the processing circuit 35 through the through-holes of the board 75.

FIGS. 5A and 5B show the contact state of the brushes on the printed circuit board 75 provided with the gray code patterns and the patterns for connecting with the pins a0–a4. At first, reference is made to FIG. 5A for explaining the function of the brushes at the manual setting of the ISO sensitivity. When one of the ISO sensitivities, other than the mark A, on the dial 8 is matched with the indicator 10, the engaging member 50b of the support member 50 does not engage with the engaging pin 53a of the support member 53, whereby said support member 53 is biased clockwise by a biasing spring 76 and is maintained in contact with a fixed pin 77 provided on the camera body. Each brush 54 of the support member 53 is composed of a pair of brushes 54a, 54b which are mutually connected electrically. As shown in FIGS. 4A, 4B, said brushes 54 may be positioned in the range A to connect the patterns 59 with 62 and to connect the pattern 60 with 64, or positioned in the range X to disconnect said patterns, thus performing the switch function. The clockwise biasing of the support member 53 moves the brushes 54a from the range A to the range X, whereby the patterns in the range A are mutually insulated, as realized by the movement of the brushes 54 to the range X as shown in FIG. 4A. The movement of the support member 50 of the manual brush is confined between limiting pins 78, 79 fixed on the camera body, and the brushes 51 supported by said support member 50 move in the ranges X and M. When positioned in contact with the gray code patterns in the range M, the brushes 51 read the gray code signals at such position and supply said signals from the ends of the range M to the input ports C0–C5, A/M of the processing circuit 35.

Now, reference is made to FIG. 5B showing the function of the brushes in the automatic setting of the ISO sensitivity. When the dial 8 is so rotated as to match the mark A with the indicator 10, the engaging member 50b of the support member 50 engages with the engaging pin 53a of the support member 53, whereby the support member is rotated counterclockwise against the function of the biasing spring 76. When the mark A meets the indicator 10, the support member 50 is brought into contact with the limiting pin 78. The brushes 54a, 54b enter the range A to mutually connect the corresponding patterns as shown in FIG. 4B, while the brushes 51 are moved to the range X. Consequently, the binary code signals of the codes 4 of the film cartridge are detected by the contact pins a0–a4 and are transmitted, through the ranges A and M, to the input ports C0–C4, A/M of the processing circuit 35.

As explained in the foregoing, in the first embodiment of the present invention, patterns for switching function are formed on the printed circuit board having the gray code patterns for manual ISO sensitivity setting, in order to achieve the switchover of the automatic and manual settings by means of the ISO sensitivity setting dial. Also in addition to the manual brushes there are provided automatic brushes in the ISO sensitivity setting dial, so that the selection of the automatic and manual setting of the ISO sensitivity can be easily achieved by the linked movement of said brushes through a simple link mechanism. Besides the ranges A and X for the above-mentioned switching function does not require a large area on the printed circuit board 75, so that the range M may have a sufficient length for the gray code patterns for generating the ISO sensitivity information signals in the conventional manner. Besides the dial can be easily manipulated since the ISO sensitivities can be sufficiently separated angularly. Furthermore, the ISO sensitivity setting device can be realized in compact manner, since the input ports C0–C5 of the processing circuit can be used for both automatic and manual settings. Furthermore, in the automatic set mode, the ISO sensitivity information signals detected by the contact pins a0–a4 are supplied to the input ports C0–C4, A/M of the processing circuit 35 through the connecting patterns 55, 56 for the gray code patterns utilized in the manual setting mode, so that the patterns on the printed circuit board 75 can be effectively utilized and the information signals automatically set can be transmitted to the input ports C0–C4 without the use of other patterns.

Figure 6:
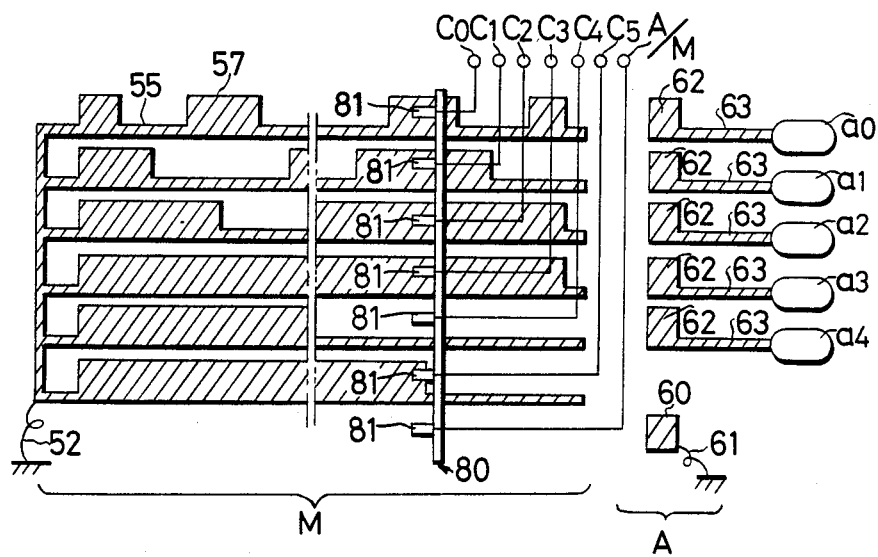
FIG. 6 is an expansion of a printed circuit board for film sensitivity setting.

Now, reference is made to FIGS. 6 to 7B for explaining a second embodiment of the present invention, wherein the same components as those in the first embodiment are represented by the same numbers and are not explained further. Like the first embodiment, the second embodiment also is based on the concept of the present invention shown in FIG. 3, and the difference lies in the fact that the automatic brush and the manual brush are formed as a single brush unit, and the patterns on the printed circuit board only contain the ranges A and M.

As shown in FIG. 6, six gray code patterns on the printed circuit board are mutually connected at an end and are grounded by the wire 52. Seven brushes 81 gliding on said gray code patterns are mutually insulated and are fixed on a support member 80. The seven brushes 81 are respectively connected to input ports C0–C5 and a switching port A/M. Patterns 62 on the board are connected, in a similar manner as explained before, with the contact pins a0–a4 through patterns 63. Said five patterns 62 respectively correspond, from top to bottom, to the gray code patterns in the range M. Below the patterns 62 there is provided a shortcircuiting pattern 60 which is grounded by a wire 61. The range A is composed of five patterns 62 and a pattern 60. In the range M, six brushes 81 corresponding to the ports C0–C5 from top to bottom contact six gray code patterns, and a brush corresponding to the port A/M contacts an insulating area below the gray code patterns. In the range A, five brushes 81 corresponding to the ports C0–C4 from top to bottom contact five patterns 62, and a brush 81 corresponding to the port A/M contacts the pattern 60. Now, there will be given a more detailed explanation on the movement of the brush unit composed of the brushes 81 and the support member 80 on the printed circuit board.

FIGS. 7A and 7B show the relation between the brush unit and the printed circuit board 82 provided in the film sensitivity setting unit in a similar manner as shown in FIGS. 5A and 5B. A support member 80 is rendered rotatable about the film rewinding shaft 74. The brushes 81 are fixed on the support member 80 which also supports a flexible printed circuit board 83. The printed circuit board 82 is provided with the patterns shown in FIG. 6, wherein ranges M and A (both indicated by double-dotted chain lines) respectively correspond to the ranges M and Z shown in FIG. 7A. The flexible printed circuit board 83 is connected electrically at an end thereof with the six brushes 81 at the support member 80 and is fixed, at the other end thereof, to the printed circuit board 82 for example by soldering. Said flexible printed circuit board 83 is connected to the input ports C0–C5 and the switching port A/M of the processing circuit 35, and the patterns 62 are connected to the contact pins a0–a4. Said flexible printed circuit board has such a length as to allow free movement of the support member 80 between the ranges A and M, namely between the limiting pins 78, 79.

Now there will be explained the function of the second embodiment. When the dial 8 is rotated as explained in relation to the first embodiment to match the mark A with the indicator 10, thus selecting the automatic setting mode, the brushes 81 enter the range A to contact with the patterns 62, 60. Thus the signals from the contact pins a0–a4 contacting with the codes 4 of the film cartridge bearing the film sensitivity information signals are transmitted to the patterns 62 of the printed circuit board 82, and are entered to the input ports C0–C4 of the processing circuit 35 through the brushes 81 and the printed circuit board 83, 82, while the pattern 60 in the range A contacts with the brush 81 connected with the switching port A/M for entering a signal for instructing the conversion of the ISO sensitivity signal into processable binary code signals, to the CPU 36 of the processing circuit 35.

On the other hand, when one of the ISO sensitivities 6–12800 is selected in the manual setting mode by rotating the dial 8, the brushes 81 enter the range M to contact the patterns therein, whereby said brushes 81 detect gray code signals corresponding to the ISO sensitivity and supplies said signals to the input ports C0–C5 of the processing circuit 35 through the printed circuit boards 83, 82. Also the brush 81 connected to the switching port A/M supplies the CPU 36 of the processing circuit 35 with a signal for instructing the conversion of the gray code signals into binary code signals.

In the second embodiment, in contrast to the first embodiment, the brushes are supported and moved by a single support member. Also the ISO sensitivity signals are directly obtained from the brushes through a flexible printed circuit board connected thereto. Consequently, in comparison with the first embodiment, the film sensitivity setting device can be realized in a more compact structure.

What we claim is:

1. A film sensitivity setting device for use in a camera which can be loaded with a film cartridge provided with a sensitivity information indicating a film sensitivity and is provided with means for controlling the exposure of said film and a member for being operated to select one of plural predetermined film sensitivities or the film sensitivity indicated by said sensitivity information, comprising:

(a) means for detecting said sensitivity information of said film cartridge;
   (b) a first area in which plural conductors are formed for indicating said plural predetermined film sensitivities;
   (c) a second area in which plural conductors are formed for electrically transmitting said sensitivity information detected by said detecting means;
   (d) contact means for contacting at least a part of said plural conductors in said first area in response to the selection of one of said plural predetermined film sensitivities by said member;
   (e) connection means for connecting said plural conductors in said first area with said plural conductors in said second area in response to the selection of said sensitivity information; and
   (f) plural terminals connected to each of plural conductors in said first area, said plural terminals supplying, as an input, the electrical signal showing the film sensitivity selected by said member to said means for controlling the exposure of the film when said contact means contacts at least a part of said plural conductors in said first area and said plural terminals supplying, as an input, the electrical signal showing said sensitivity information to said means for controlling the film exposure through said plural conductors in said first area when said connection means connects the plural conductors in said first area with said plural conductors in said second area.

2. A film sensitivity setting device according to claim 1, further comprising a circuit board for positioning said plural conductors of said first and second areas on a same plane.

3. A film sensitivity setting device according to claim 1, wherein said plural terminals produce, as an output, first binary signal indicating the film sensitivity selected by said member when said contact means contacts at least a part of said plural conductors in said first area, while said plural terminals produce, as an output, second binary signal showing said sensitivity information when said contact means contacts said plural conductors in said second area; and wherein the device includes means for converting said first and second binary signals into a third binary signal for being supplied to said means for controlling the film exposure.

4. A film sensitivity setting device for use in a camera which can be loaded with a film cartridge provided with a sensitivity information indicating a film sensitivity by a first binary code and is provided with means for controlling the exposure of said film and a member for being operated to select one of plural predetermined film sensitivities or the film sensitivity indicated by said sensitivity information, comprising:

(a) means for detecting said sensitivity information of said film cartridge;
(b) a first area in which plural conductors are formed for indicating said plural predetermined film sensitivities by a second binary code;
(c) a second area in which plural conductors are formed for electrically transmitting said sensitivity information detected by said detecting means;
(d) contact means for contacting at least a part of said plural conductors in said first area in response to the selection of one of said plural predetermined film sensitivities by said member and contacting said plural conductors in said second area in response to selection of said sensitivity information by said member, said contact means producing, as an output, first binary signal indicating said film sensitivity selected by said member according to said second binary code when said contact means contacts at least a part of said plural conductors in said first area, while said contact means producing, as an output, second binary signal indicating said sensitivity information when said contact means contacts said plural conductors in said second area; and
(e) means for converting said first and second binary signals into a third binary signal in accordance with a third binary code to supply said third binary signal to said means for controlling said film exposure, said third binary code being different from said first binary code and said second binary code.

5. A film sensitivity setting device according to claim 4, further comprising a circuit board for positioning said plural conductors of said first and second areas on a same plane.

* * * * *